(12) United States Patent
Gettemy et al.

(10) Patent No.: US 6,545,862 B1
(45) Date of Patent: Apr. 8, 2003

(54) METHOD AND SYSTEM FOR AN INTERCHANGEABLE MODULAR DISPLAY SCREEN FOR A PORTABLE COMPUTING DEVICE

(75) Inventors: Shawn Gettemy, San Jose, CA (US); Neal Osborn, Milpitas, CA (US); Joe Tate, San Jose, CA (US); Francis James Canova, Jr., Fremont, CA (US)

(73) Assignee: Palm, Inc., Santa Clara, CA (US)

( * ) Notice: Subject to any disclaimer, the term of this patent is extended or adjusted under 35 U.S.C. 154(b) by 85 days.

(21) Appl. No.: 09/608,823

(22) Filed: Jun. 30, 2000

Related U.S. Application Data (63) Continuation-in-part of application No. 09/579,123, filed on May 25, 2000.

(51) Int. Cl.[7] .................................................. G06F 1/16
(52) U.S. Cl. ........................ 361/683; 361/686; D14/106
(58) Field of Search ................................. 361/686, 683, 361/681, 682, 684; 312/223.1, 223.2; D14/107, 106

(56) References Cited

U.S. PATENT DOCUMENTS

| | | | | |
|---|---|---|---|---|
| 5,227,953 A | * | 7/1993 | Lindberg et al. | 361/686 |
| 5,331,509 A | * | 7/1994 | Kikinis | 361/686 |
| 5,436,792 A | * | 7/1995 | Leman et al. | 361/686 |
| 5,627,728 A | * | 5/1997 | Ma et al. | 361/686 |
| 5,805,416 A | * | 9/1998 | Friend et al. | 361/686 |
| 5,928,320 A | | 7/1999 | Forsythe | 708/708.1 |
| 5,933,812 A | * | 8/1999 | Meyer et al. | 361/686 |
| 6,049,450 A | * | 4/2000 | Cho et al. | 361/683 |
| 6,052,279 A | * | 4/2000 | Friend et al. | 361/686 |
| 6,108,200 A | * | 8/2000 | Fullerton | 361/686 |
| 6,115,248 A | * | 9/2000 | Canova et al. | 361/686 |
| 6,266,685 B1 | * | 7/2001 | Danielson et al. | 361/686 |
| 6,282,088 B1 | * | 8/2001 | Canova et al. | 361/686 |
| 6,283,777 B1 | * | 9/2001 | Canova et al. | 439/218 |

* cited by examiner

*Primary Examiner*—Darren Schuberg
*Assistant Examiner*—Lisa Lea-Edmonds
(74) *Attorney, Agent, or Firm*—Wagner, Murabito & Hao LLP (57) ABSTRACT

A portable computer system (e.g., a palmtop or hand-held computer system) is implemented with an interface module containing circuitry needed to connect with and operate a device such as a display device. The interface module is coupled to the display device. Additionally, the interface module may be coupled to a printed circuit (PC) board of the portable computer system. As such, PC board can thus be designed and manufactured independently of the display device. Furthermore, design variations in the display device can be independently accommodated in the interface module. Thus, the combination of the interface module, the device, and/or the PC board can be universally implemented in different designs of portable computer systems, reducing development time and manufacturing costs.

28 Claims, 13 Drawing Sheets

| PIN TABLE 800 | | | |
|---|---|---|---|
| PIN NO. | Function | Color | Mono |
| 1 | Touch Panel Signal | T1 | T1 |
| 2 | Touch Panel Signal | T2 | T2 |
| 3 | Touch Panel Signal | T3 | T3 |
| 4 | Touch Panel Signal | T4 | T4 |
| 5 | Lighting Enable Signal | LIGHT_ON | LIGHT_ON |
| 6 | Battery Voltage | $V_{BATT}$ | $V_{BATT}$ |
| 7 | Digital Ground | GND | GND |
| 8 | Pixel Clock Signal | CLK | CLK |
| 9 | Horizontal Clock Signal | HSYNC | HSYNC |
| 10 | Vertical Clock Signal | VSYNC | VSYNC |
| 11 | General Purpose Signal | GPIO | GPIO |
| 12 | Logic Voltage | $V_{DD}$ | $V_{DD}$ |
| 13 | Digital Ground | GND | GND |
| 14 | General Purpose Signal | GPIO | GPIO |
| 15 | General Purpose Signal | GPIO | GPIO |
| 16 | Enable $V_{DD}$ and $V_{BATT}$ | LCD_ON | LCD_ON |
| 17 | Data Signal | D | D |
| 18 | Data Signal | D | D |
| 19 | Data Signal | D | D |
| 20 | Data Signal | D | D |
| 21 | Data Signal | D | |
| 22 | Data Signal | D | |
| 23 | Digital Ground | GND | |
| 24 | Data Signal | D | |
| 25 | Data Signal | D | |
| 26 | Data Signal | D | |
| 27 | Data Signal | D | |
| 28 | Data Signal | D | |
| 29 | Data Signal | D | |
| 30 | Digital Ground | GND | |
| 31 | Data Signal | D | |
| 32 | Data Signal | D | |
| 33 | Data Signal | D | |
| 34 | Data Signal | D | |
| 35 | Data Signal | D | |
| 36 | Data Signal | D | |
| 37 | Output to Select Interface | LCD_TYPE | |
| 38 | General Purpose Signal | GPIO | |
| 39 | General Purpose Signal | GPIO | |
| 40 | General Purpose Signal | GPIO | |

METHOD AND SYSTEM FOR AN INTERCHANGEABLE MODULAR DISPLAY SCREEN FOR A PORTABLE COMPUTING DEVICE

CROSS REFERENCE TO RELATED APPLICATIONS

This is a continuation-in-part of U.S. patent application Ser. No.: 09/579,123 entitled "Selectively Relocatable and Universal Interface Module with Circuitry for a Display Screen" by Shawn Gettemy et al., filed May 25, 2000, and assigned to the assignee of the present invention. This application is hereby incorporated by reference.

TECHNICAL FIELD

The present invention generally relates to the field of portable electronic devices. More particularly, the present invention relates to the field of personal digital assistants (PDAs) and other similar types of portable electronic devices.

BACKGROUND ART

As the components required to build a computer system are reduced in size, new categories of computer systems are emerging. One of the more recent categories of computer systems is the portable, or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Because of their relatively small size, designers of portable computer systems are faced with the challenge of having to fit the various internal components as efficiently as possible into a small housing. This task is complicated because there may be different models built on the same basic platform. Each model may require a different hardware configuration depending on the features it incorporates, yet the internal components must still fit into the standard-size housing.

For example, a palmtop computer system may utilize either a monochrome display device or a color display device. The display screen for the color device is typically thicker than the screen of a monochrome device, and generally there are differences between the circuitry needed to connect and drive a monochrome display device versus a color display device. The display device is typically connected to a printed circuit board of the palmtop computer system, and thus different printed circuit board designs are needed in order to accommodate differences in the connection circuitry. Each version of a component increases the number of parts to be tracked and managed, thereby complicating the design process.

Variability in design may also be introduced by the different manufacturers and vendors of display devices, each of which may have their own connector scheme and interface circuitry. Thus, the number of printed circuit board designs of a palmtop computer system is increased further to accommodate the different manufacturers, adding more parts that need to be tracked.

Additionally, each palmtop computing device is typically implemented with a unique display screen, which is usually not interchangeable among different palmtop computing models. Moreover, as mentioned above, the display screen is connected so specifically to the printed circuit board of the palmtop computing device, it usually does not provide any type of production postponement for customization late in the production process, where, for example it may be desirable to substitute a monochrome display screen for a color display screen, or vice versa.

Another disadvantage associated with the palmtop computing device being design specifically for a particular display screen is that non-availability or shortages of that specific display device results in the production process coming to a halt.

DISCLOSURE OF THE INVENTION

Accordingly, what is needed is a method and system for providing a modular solution which allows customization of a palmtop computing device late in its production process. In this manner, the user would have the ability to choose whether to build their palmtop computing device with a color or monochrome display screen. The present invention provides this advantage and others which will no doubt become obvious to those of ordinary skill in the art after having read the following detailed description of embodiments in accordance with the present invention.

For example, a portable computer system (e.g., a palmtop or hand-held computer system) is implemented with an interface module containing circuitry needed to connect with and operate a device such as a display device. The interface module is coupled to the display device. Additionally, the interface module may be coupled to a printed circuit (PC) board of the portable computer system. As such, PC board can thus be designed and manufactured independently of the display device. Furthermore, design variations in the display device can be independently accommodated in the interface module. Thus, the combination of the interface module, the device, and/or the PC board can be universally implemented in different designs of portable computer systems, reducing development time and manufacturing costs.

In another embodiment, the present invention includes a portable computer system that includes a device for performing a function. Furthermore, the portable computer system includes an interface module coupled to the device. The interface module includes circuitry requisite for the function. Wherein the interface module and the device, in combination, are useable in different portable computer system designs.

In one embodiment, the interface module includes a universal coupler. In another embodiment, the portable computer system also includes a printed circuit board coupled to the interface module.

In yet another embodiment, the portable computer system includes a printed circuit board which is coupled to the interface module, wherein the printed circuit board includes a first universal coupler. In still another embodiment, the portable computer system includes the details of the embodiment just described along with the interface module including a second universal coupler. It is appreciated that the first universal coupler is coupled to the second universal coupler.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing", "installing", "outputting", "generating", "receiving", "transmitting", "determining", "using" or the like, refer to the actions and processes of a computer system, or similar electronic device including a personal digital assistant (PDA). The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Palmtop Platform

Figure 1A:
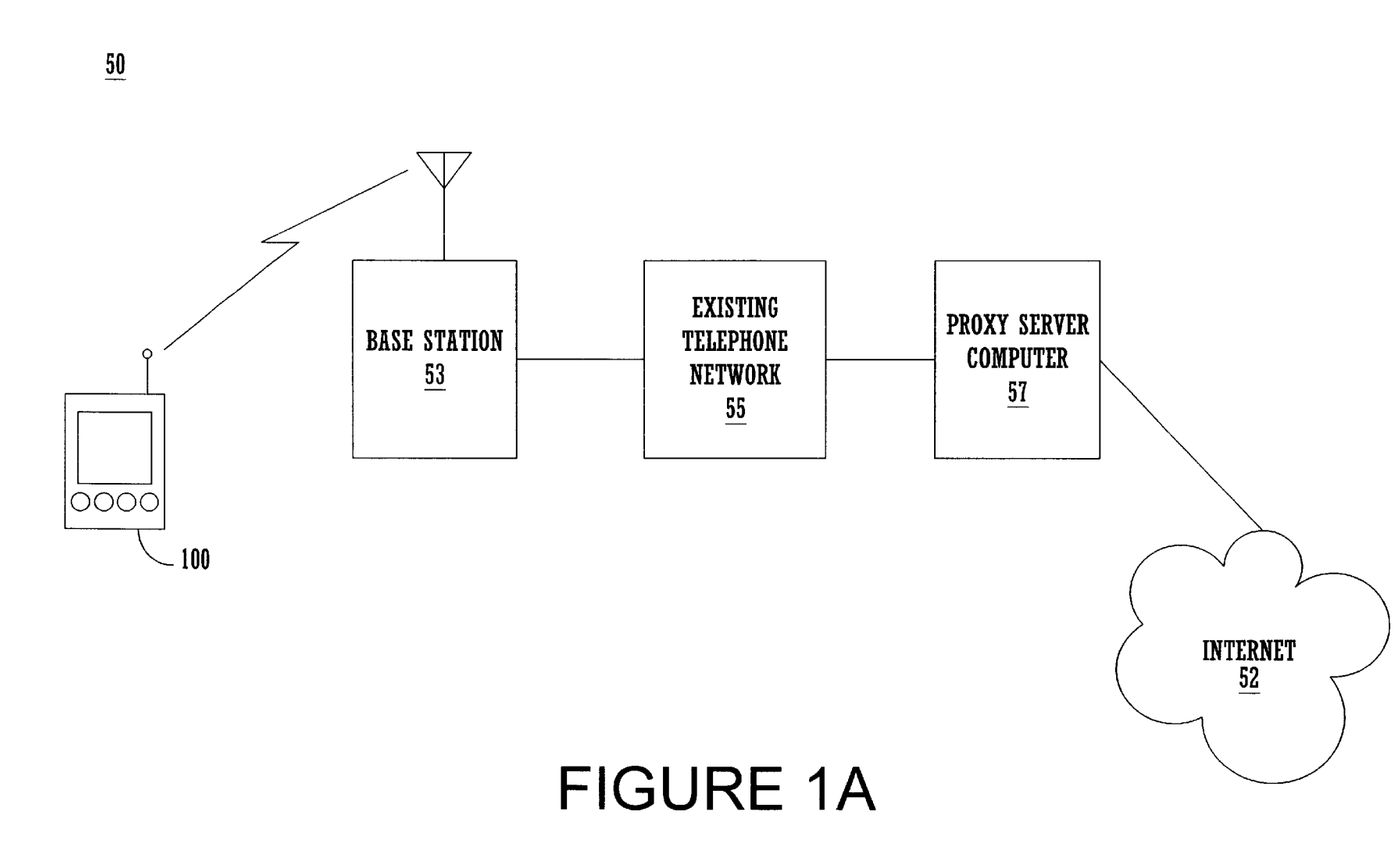
FIG. 1A is a block diagram of an exemplary network environment including a portable computer system that can be implemented in accordance with one embodiment of the present invention.

FIG. 1A is a block diagram of an exemplary network environment 50 including an exemplary portable computer system 100 that can be implemented in accordance with one embodiment of the present invention. Portable computer system 100 is also known as a palmtop computer system, a palm-sized computer system, a hand-held computer system, or a personal digital assistant (PDA). Portable computer system 100 has the ability to transmit and receive data and information over a wireless communication interface (e.g., a radio interface).

Base station 53 can be both a transmitter and receiver base station, which can be implemented by coupling it into an existing public telephone network 55. Implemented in this manner, base station 53 enables portable computer system 100 to communicate with a proxy server computer system 57, which is coupled by wire to the existing public telephone network 55. Furthermore, proxy server computer system 57 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that one of the functions of proxy server 57 is to perform operations over the Internet 52 on behalf of portable computer system 100. For example, proxy server 57 has a particular Internet address and acts as a proxy device for portable computer system 100 over the Internet 52. It should be further appreciated that other embodiments of a communications network may be utilized in accordance with the present invention.

The data and information which are communicated between base station 53 and portable computer system 100 are the same type of information and data that can conventionally be transferred and received over a public telephone wire network system. However, a wireless communication interface is utilized to communicate data and information between portable computer system 100 and base station 53. It should be appreciated that one embodiment of a wireless communication system in accordance with the present invention is the Mobitex wireless communication system.

Figure 1B:
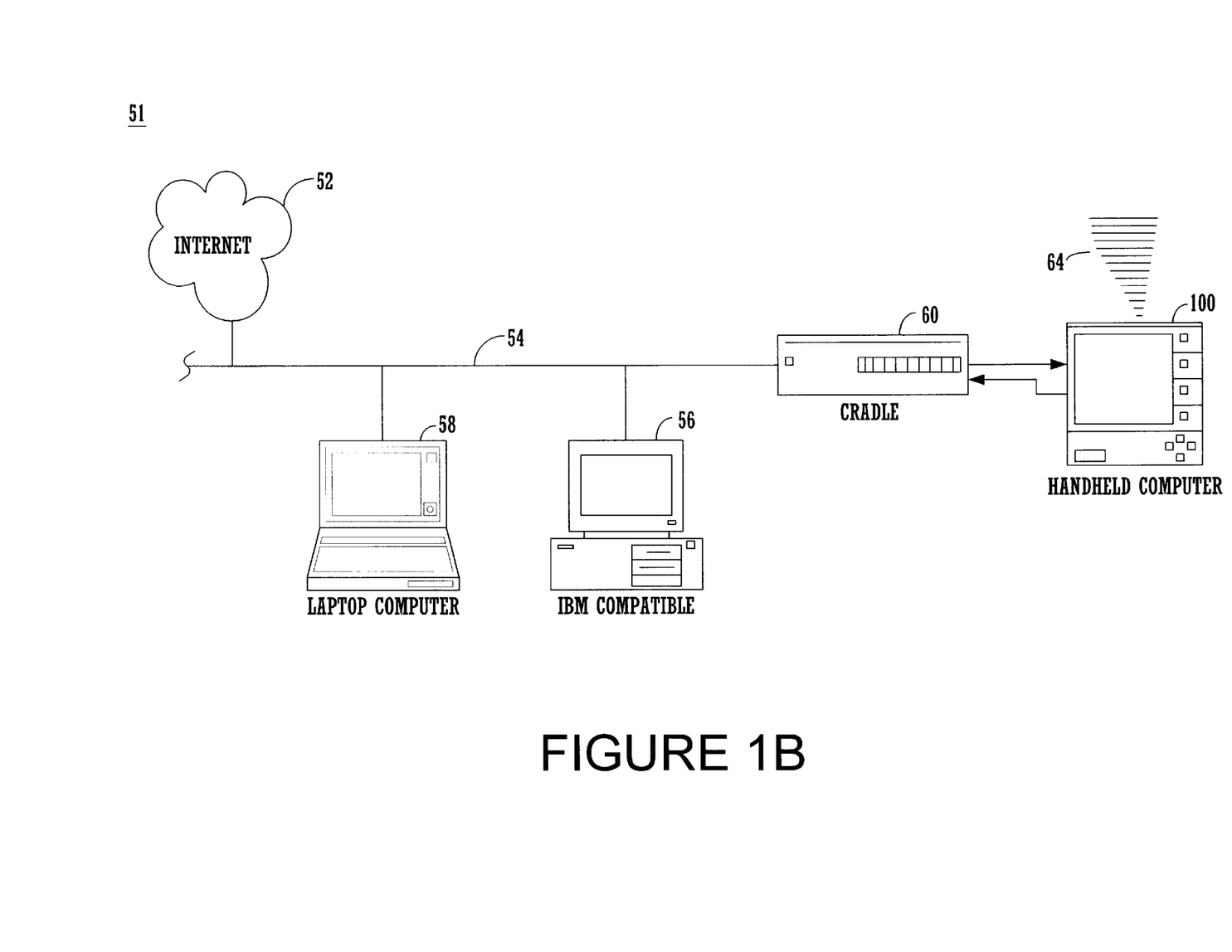
FIG. 1B is a block diagram of the exemplary portable computer system of FIG. 1A connected to other computer systems and the Internet via a cradle device.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

With reference to both FIGS. 1A and 1B, it is appreciated that portable computer system 100 can be used in a network environment combining elements of networks 50 and 51. That is, portable computer system 100 can include both a wireless infrared communication mechanism and a signal (e.g., radio) receiver/transmitter device.

Figure 2A:
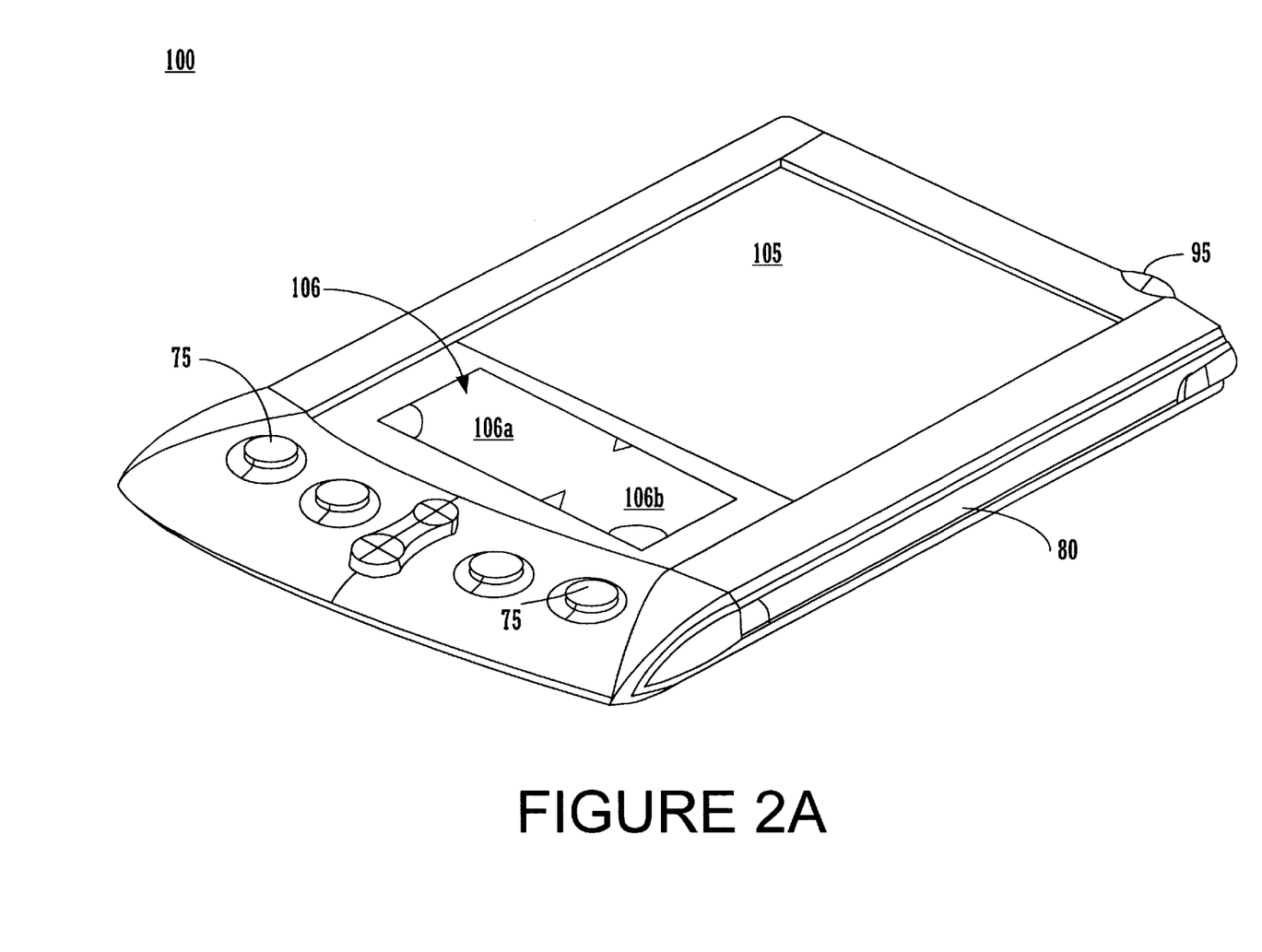
FIG. 2A is a top side perspective view of an exemplary portable computer system that can be used in accordance with one embodiment of the present invention.

FIG. 2A is a perspective illustration of the top face of exemplary portable computer system 100 that can be used in accordance with one embodiment of the present invention. The top face contains a display screen 105 surrounded by a bezel or cover. A removable stylus 80 is also shown. The display screen 105 is a touch screen capable of registering contact between the screen and the tip of stylus 80. The stylus 80 can be fabricated of any material which can make contact with the screen 105. The top face also contains one or more dedicated and/or programmable buttons 75 for selecting information and causing the computer system 100 to implement functions. The on/off button 95 is also shown.

FIG. 2A also illustrates a handwriting recognition pad (e.g., an alphanumeric input device 106) containing two regions 106a and 106b. Alphanumeric input device 106 is also known as a digitizer, digitizer tablet, or graffiti area. Region 106a is for the drawing of alphabetic characters therein for automatic recognition while region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the display device 105 for verification and/or modification.

Figure 2B:
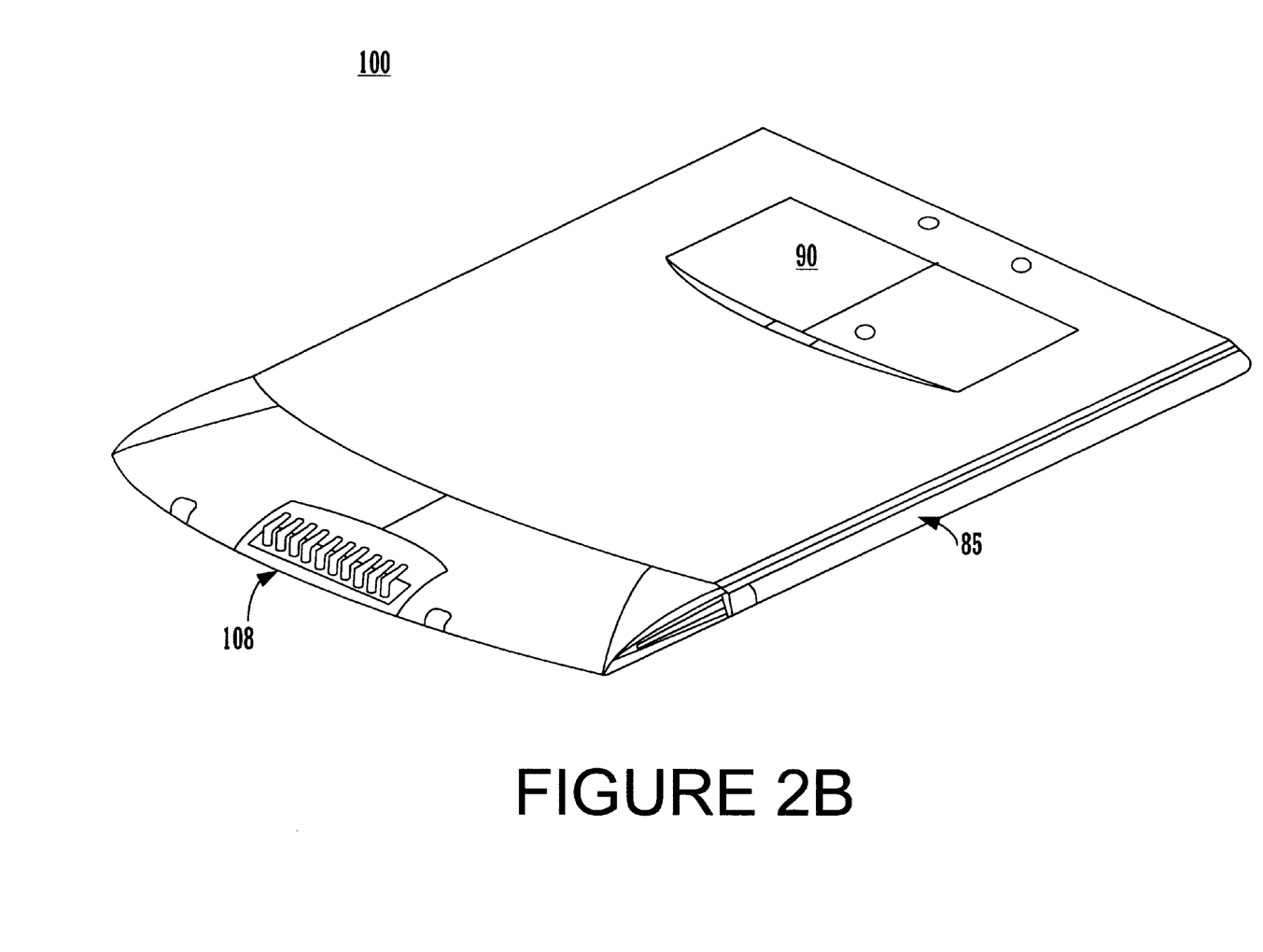
FIG. 2B is a bottom side perspective view of the exemplary portable computer system of FIG. 2A.

FIG. 2B illustrates the bottom side of one embodiment of the portable computer system 100 that can be used in accordance with various embodiments of the present invention. An extendible antenna 85 is shown, and also a battery storage compartment door 90 is shown. A communication interface 108 is also shown. In one embodiment of the present invention, the communication interface 108 is a serial communication port, but could also alternatively be of any of a number of well-known communication standards and protocols, e.g., parallel, SCSI (small computer system interface), Firewire (IEEE 1394), Ethernet, etc.

Figure 3:
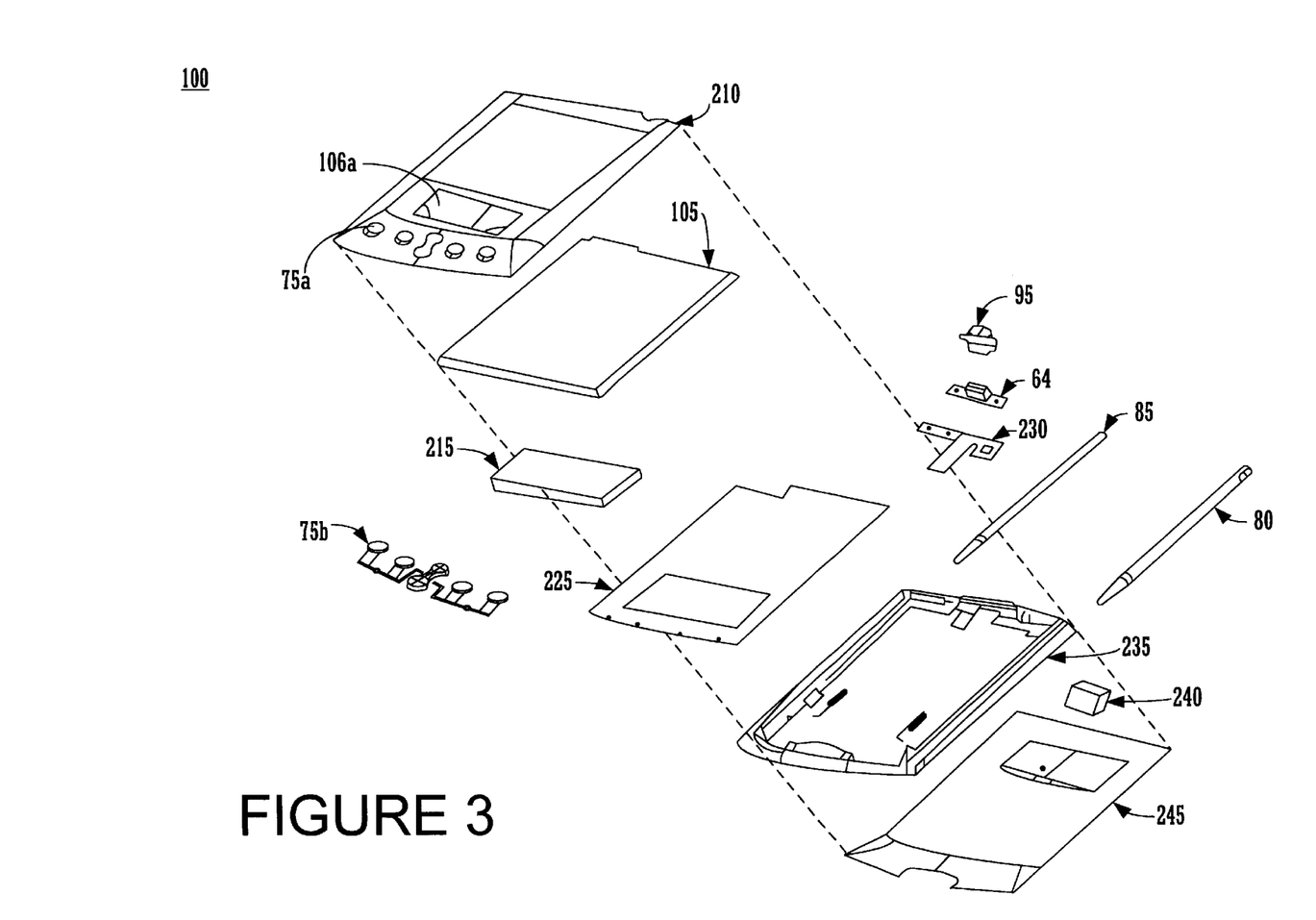
FIG. 3 is an exploded view of the components of the exemplary portable computer system of FIG. 2A.

With reference now to FIG. 3, an exploded view of the exemplary portable computer system 100 is shown. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission device (FED), plasma, etc., for the flat panel display 105. A battery 215 provides electrical power. On/off button 95 is shown along with an infrared emitter and detector device 64. A flex circuit 230 is shown along with a PC board 225 containing electronics and logic (e.g., memory, communication bus, processor, etc.) for implementing computer system functionality. A midframe 235 is shown along with stylus 80. Position adjustable antenna 85 is also shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server (see FIG. 1A).

Figure 4:
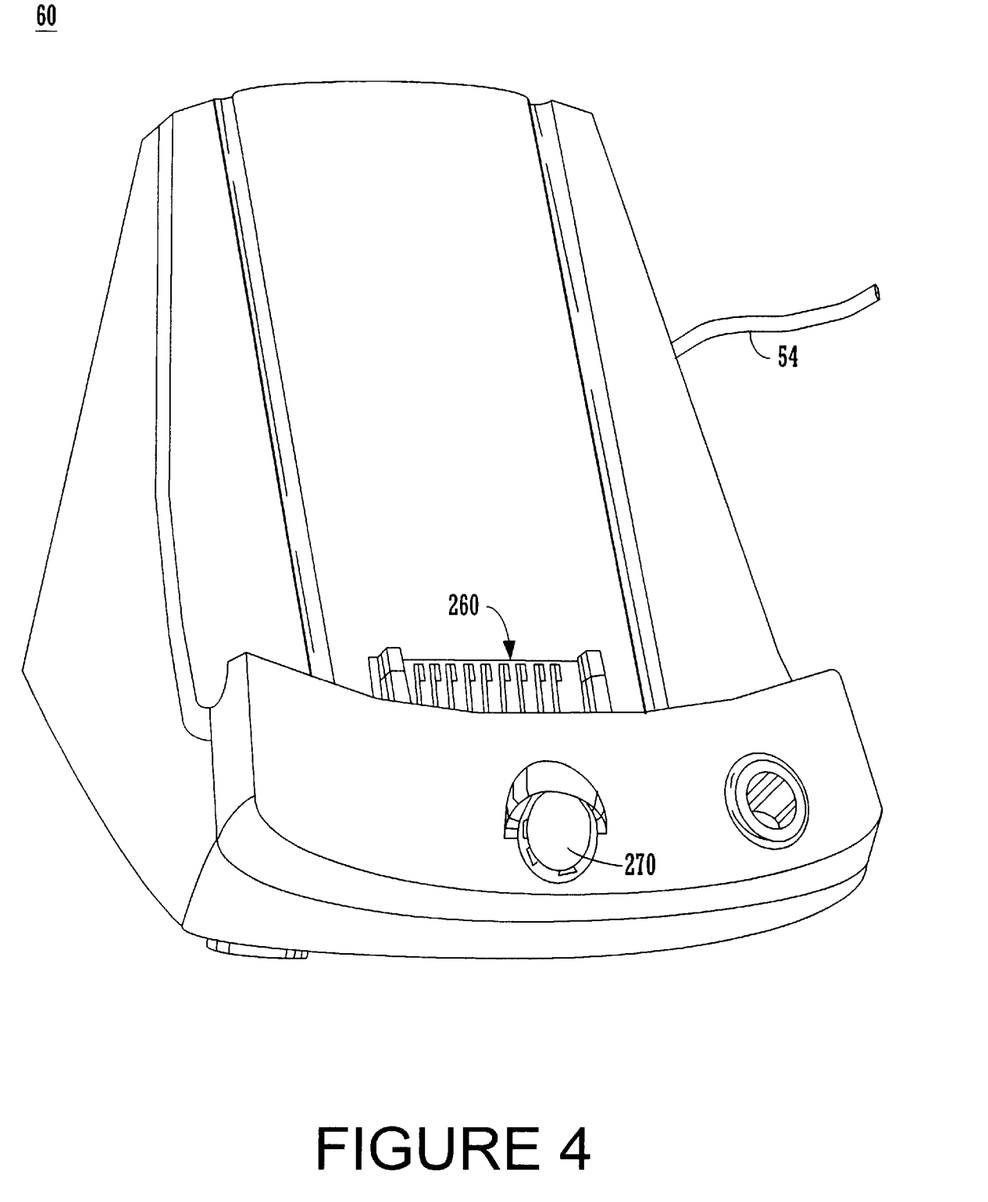
FIG. 4 is a perspective view of the cradle device for connecting the portable computer system to other systems via a communication interface.

FIG. 4 is a perspective illustration of one embodiment of the cradle 60 for receiving the portable computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication bus 54.

Figure 5:
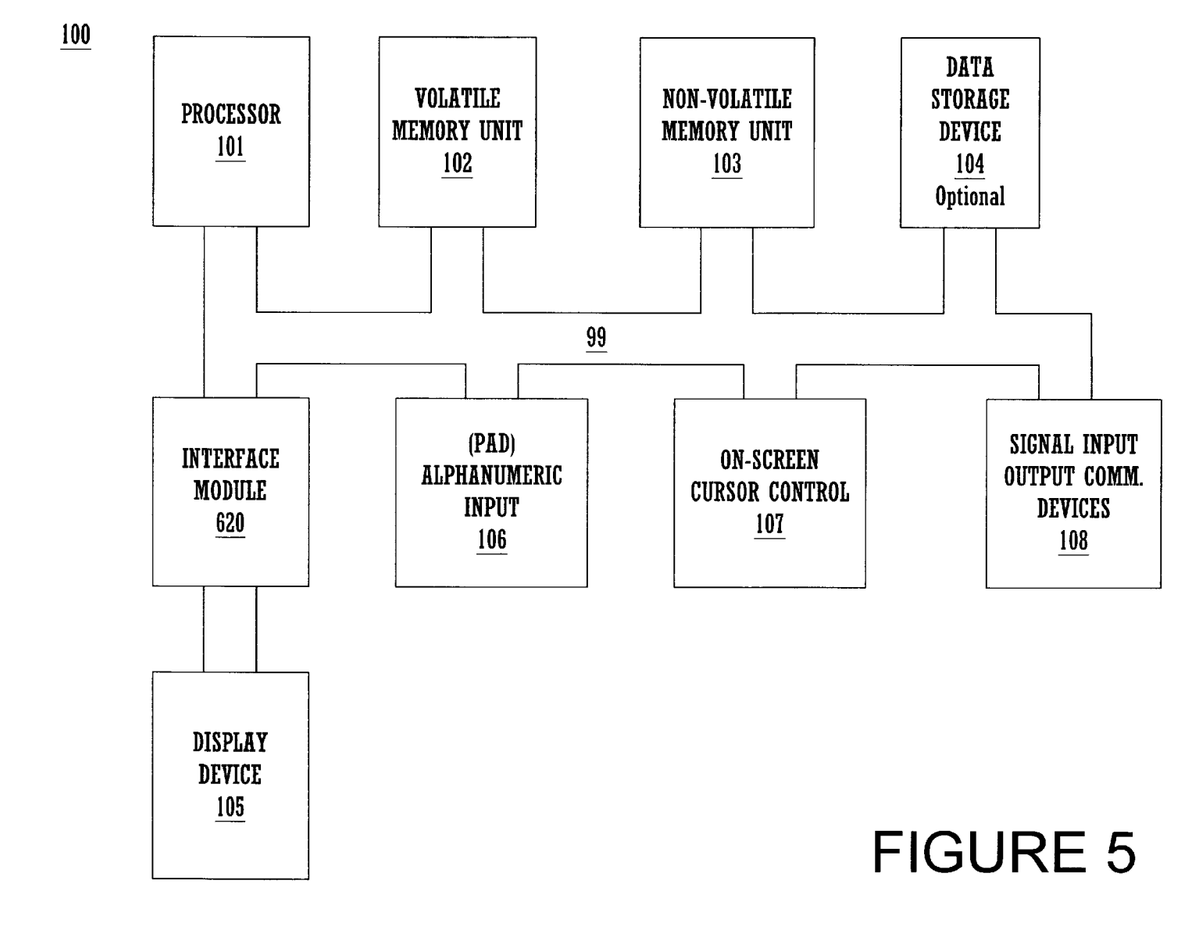
FIG. 5 is a logical block diagram of circuitry located within the exemplary portable computer system of FIG. 2A.

FIG. 5 illustrates circuitry of exemplary portable computer system 100, some of which can be implemented on PC board 225. Portable computer system 100 includes an address/data bus 99 for communicating information, a central processor 101 coupled with the bus 99 for processing information and instructions, a volatile memory unit 102 (e.g., random access memory, static RAM, dynamic RAM, etc.) coupled with the bus 99 for storing information and instructions for the central processor 101 and a non-volatile memory unit 103 (e.g., read only memory, programmable ROM, flash memory, EPROM, EEPROM, etc.) coupled with the bus 99 for storing static information and instructions for the processor 101. Computer system 100 also includes an optional data storage device 104 (e.g., memory stick) coupled with the bus 99 for storing information and instructions. It should be appreciated that data storage device 104 can be removable. As described above, system 100 also contains a display device 105 coupled to the bus 99 for displaying information to the computer user. PC board 225 can contain the processor 101, the bus 99, the volatile memory unit 102, and the non-volatile memory unit 103.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where a stylus makes contact. The display device 105 utilized with the computer system 100 may be a liquid crystal device (LCD), organic light emitting diode (OLED), organic electroluminescence, electronic ink, field emission device (FED) which is also called flat panel cathode ray tude (CRT), or other display device suitable for creating graphic images and alphanumeric characters recognizable to the user. In the preferred embodiment, display 105 is a flat panel display. Computer system 100 also includes signal communication interface 108, which is also coupled to bus 99, and can be a serial port for communicating with the cradle 60. Device 108 can also include an infrared communication port.

In accordance with the present invention, display device 105 is coupled to bus 99 via interface module 620. Interface module 620 contains the circuitry needed to connect with and drive display device 105. Interface module 620 can provide a universal interface with any of the various types of display technologies (e.g., LCD, OLED, flat panel CRT and the like, either color or monochrome) and thus is a technology-independent architecture. Additional information with regard to interface module 620 is provided in conjunction with FIG. 6.

Universal Interface Module in Accordance with the Present Invention

Figure 6:
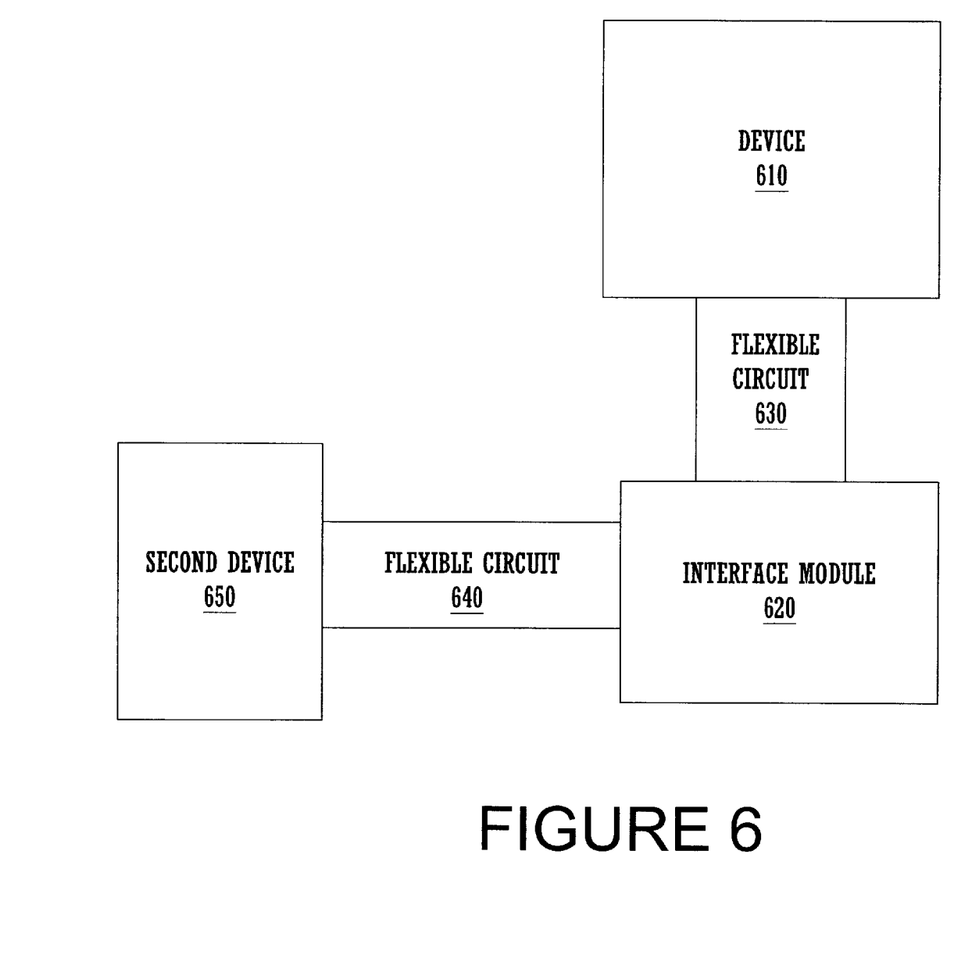
FIG. 6 is a block diagram of an interface module in accordance with one embodiment of the present invention.

FIG. 6 is a block diagram showing interface module 620 for use in a portable computer system (e.g., portable computer system 100 of FIG. 5) in accordance with one embodiment of the present invention. Interface module 620 is coupled to device 610 via a flexible circuit 630. Device 610 can be any type of device; in a preferred embodiment, device 610 is a display device (e.g., 105). Additionally, interface module 620 may be coupled to a second device 650 via a flexible circuit 640. It is appreciated that second device 650 can be any type of device. In one embodiment, second device 650 is a PC board 225 (FIG. 4) containing a processor 101 and coupled to interface module 620 by flexible circuit 640. Alternatively, second device 650 is a central processing unit (e.g., processor 101 of FIG. 5) coupled to interface module 620 by flexible circuit 640. As will be seen, interface module 620 contains the circuitry needed to connect with and drive device 610. Thus, in accordance with the present invention, this technology specific circuitry of device 610 is not included on PC board 225. As such, PC board 225 can thus be designed and manufactured independently of device 610. Furthermore, design variations in device 610 can be accommodated in interface module 620.

For example, a particular supplier of device 610 can also provide interface module 620, which would be populated with technology and circuitry specific to drive and operate device 610. Moreover, interface module 620 would also include technology enabling it to interface with PC board 225. Thus, PC board 225 can be a universal or standardized design, simplifying the process of designing a portable computer system (e.g., 100). In addition, by virtue of having a standardized design for PC board 225, the number of parts that need to be tracked can be reduced, further simplifying the design process.

In one embodiment, interface module 620 of FIG. 6 is a printed circuit board. In another embodiment, interface module 620 and flexible circuit 630 are integrated into a single flexible circuit. In yet another embodiment, interface module 620 and flexible circuit 640 are integrated into a single flexible circuit. In still another embodiment, interface module 620, flexible circuit 630 and flexible circuit 640 are integrated into a single flexible circuit.

It is appreciated that, in another embodiment, interface module 620 can be coupled to device 610 and/or to second device 650 using a connector other than a flexible circuit. It is appreciated that this embodiment is still advantageous because it provides a universal interface module with any of the various types of display technologies (e.g., LCD, OLED, flat panel CRT and the like, either color or monochrome) and thus is a technology-independent architecture.

In one embodiment, device 610 of FIG. 6 is a display device (e.g., display device 105 of FIG. 5). Device 610 can be either a color display device or a monochrome display device. In the present embodiment, interface module 620 contains the technology specific circuitry of display device 105. In other words, interface module 620 contains the circuitry which connects with and drives display device 105. Thus, PC board 225 does not need to contain the circuitry needed to drive display device 105. Instead, PC board 225 can be designed and manufactured independent of display device 105. Variations in display device 105, such as the variations associated with a monochrome versus a color display, can be accommodated in interface module 620. As described above, this simplifies the process of designing a portable computer system (e.g., 100) and reduces the number of parts that need to be tracked.

In accordance with one embodiment of the present invention, although the circuitry in interface module 620 and/or flexible circuit 630 may be different for the monochrome display versus the color display, the size and shape of interface module 620 can be the same for a monochrome display as it is for a color display (that is, it has the same "footprint"). Thus, when designing the layout of the internal components for a portable computer system, a designer can allocate a known amount of space for interface module 620, whether designing for a color display or for a monochrome display. As a result, in accordance with the present embodiment, one of the variables to be considered when designing the layout of internal components is removed, thereby further simplifying the design process.

Figure 7:
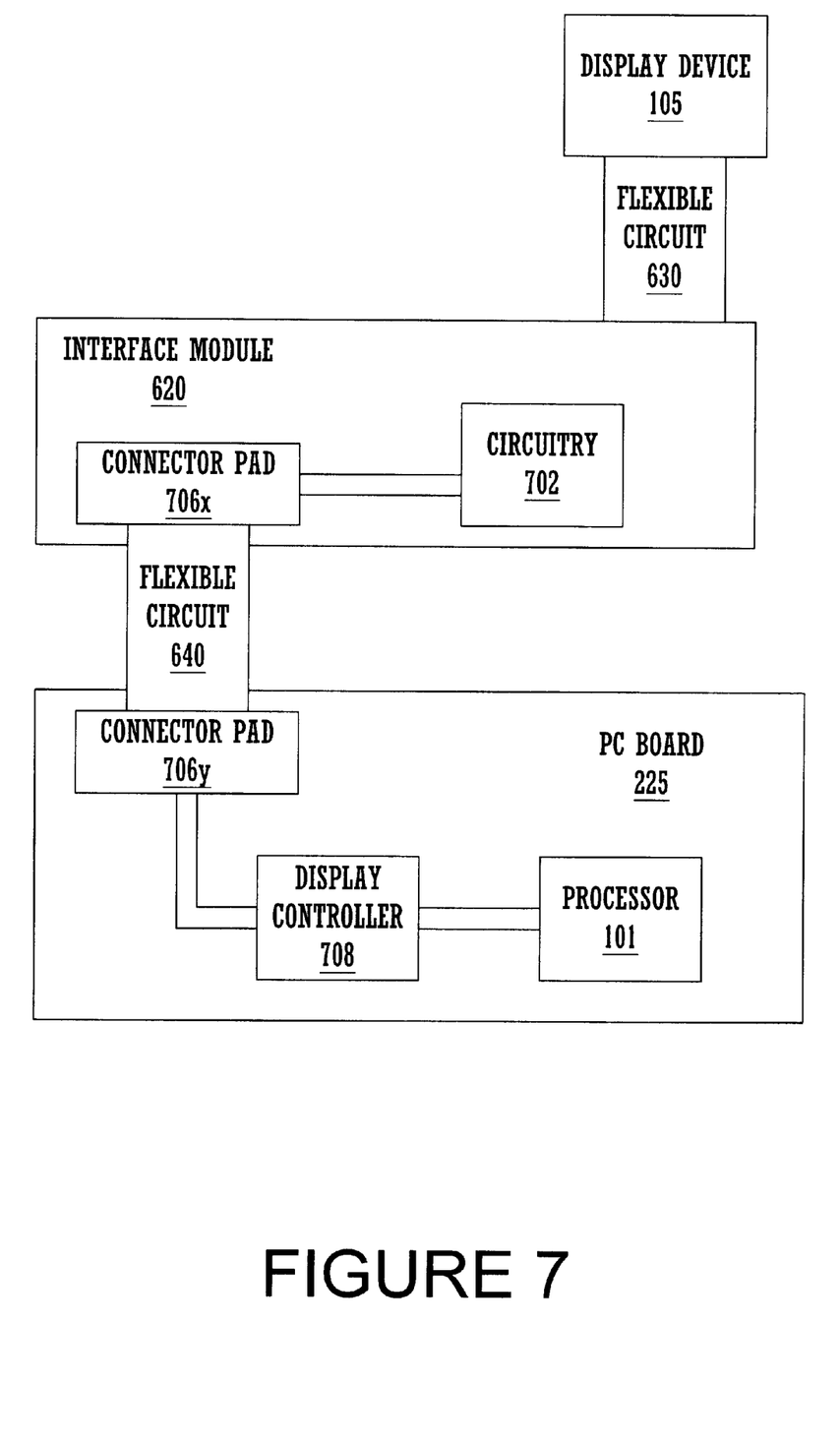
FIG. 7 is a block diagram of a specific implementation in accordance with one embodiment of the present invention of the interface module of FIG. 6.

FIG. 7 is a block diagram of a specific implementation of interface module 620 in accordance with one embodiment of the present invention. It is appreciated that interface module 620 functions in manner similar to that described above. Therefore, interface module 620 contains circuitry 702 which is needed to connect with and drive display device 105. As such, in accordance with the present invention, this technology specific circuitry 702 of device 105 is not included on PC board 225. Accordingly, PC board 225 can thus be designed and manufactured independently of display device 105. Furthermore, design variations in display device 105 can be accommodated in interface module 620.

For example, a particular supplier of display device 105 can also provide interface module 620, which would be populated with circuitry 702 which specifically drives and operates display device 105. For instance, circuitry 702 may include DC/DC converters, DC/AC inverters, timing ASIC (application specific integrated circuit), gray scale voltage circuit, VCOM circuit, connection to touch panel 106, back lighting converter, and/or power circuit for front lighting, depending on the type of display technology associated with display device 105.

For example, if display device 105 is a monochrome display device, circuitry 702 of interface module 620 may include DC/DC converters, DC/AC inverters, gray scale voltage circuit, and a connection to touch panel 106. Additionally, if display device 105 is a polysilicon TFT (thin film transistor) color display device, circuitry 702 of interface module 620 may include a timing ASIC, DC/DC converters, gray scale voltage circuit, VCOM circuit, and a connection to touch panel 106. However, if display device 105 is an amorphous silicon TFT color display device, circuitry 702 of interface module 620 may include VCOM circuit, DC/DC inverters, gray scale voltage circuit, and a connection to touch panel 106. Therefore, variations associated with a monochrome versus a color display can be accommodated in interface module 620. Thus, PC board 225 does not need to contain the circuitry needed to drive display device 105. Instead, PC board 225 can be designed and manufactured independent of display device 105.

Within the present embodiment of FIG. 7, interface module 620 is coupled to display device 105 via flexible circuit 630. Furthermore, interface module 620 may be coupled to PC board 225 via flexible circuit 640. Once PC board 225 is coupled to interface module 620, a display controller circuit 708 of PC board 225 is capable of controlling the operation of display device 105. In another embodiment, display controller circuit 708 is capable of controlling the operation of both color and monochrome display devices (e.g., 105). In yet another embodiment, it is appreciated that device controller circuit 708 (with any or all of the functionality mentioned above) can be incorporated with processor 101 of PC board 225.

In order to coupled interface module 620 with PC board 225 within the present embodiment, one end of flexible circuit 640 is coupled to connector pad 706x of interface module 620 while the other end of flexible circuit 640 is coupled to connector pad 706y of PC board 225 resulting in a board-to-board connection. In this manner, interface module 620 and PC board 225 are able to communicate. Specifically, display controller circuit 708 transmits control signals to circuitry 702 of interface module 620 via connector pad 706y, flexible circuit 640, and connector pad 706x. Subsequently, circuitry 702 responds to the received control signals which correspond to the operation and function of display device 105.

Therefore, interface module 620 of FIG. 7 is a technology-independent architecture which may contain any of the various types of display specific technologies which drive and/or operate display device 105. Accordingly, PC board 225 does not need to contain the circuitry needed to drive display device 105. Instead, PC board 225 can be designed and manufactured independent of display device 105 and interface module 620. However, in order for PC board 225 and interface module 620 to communicate within the present embodiment, a universal communication pinout has been implemented with connector pads 706x and 706y which are described in more detail below with reference to FIGS. 8A and 8B.

Figure 8A:
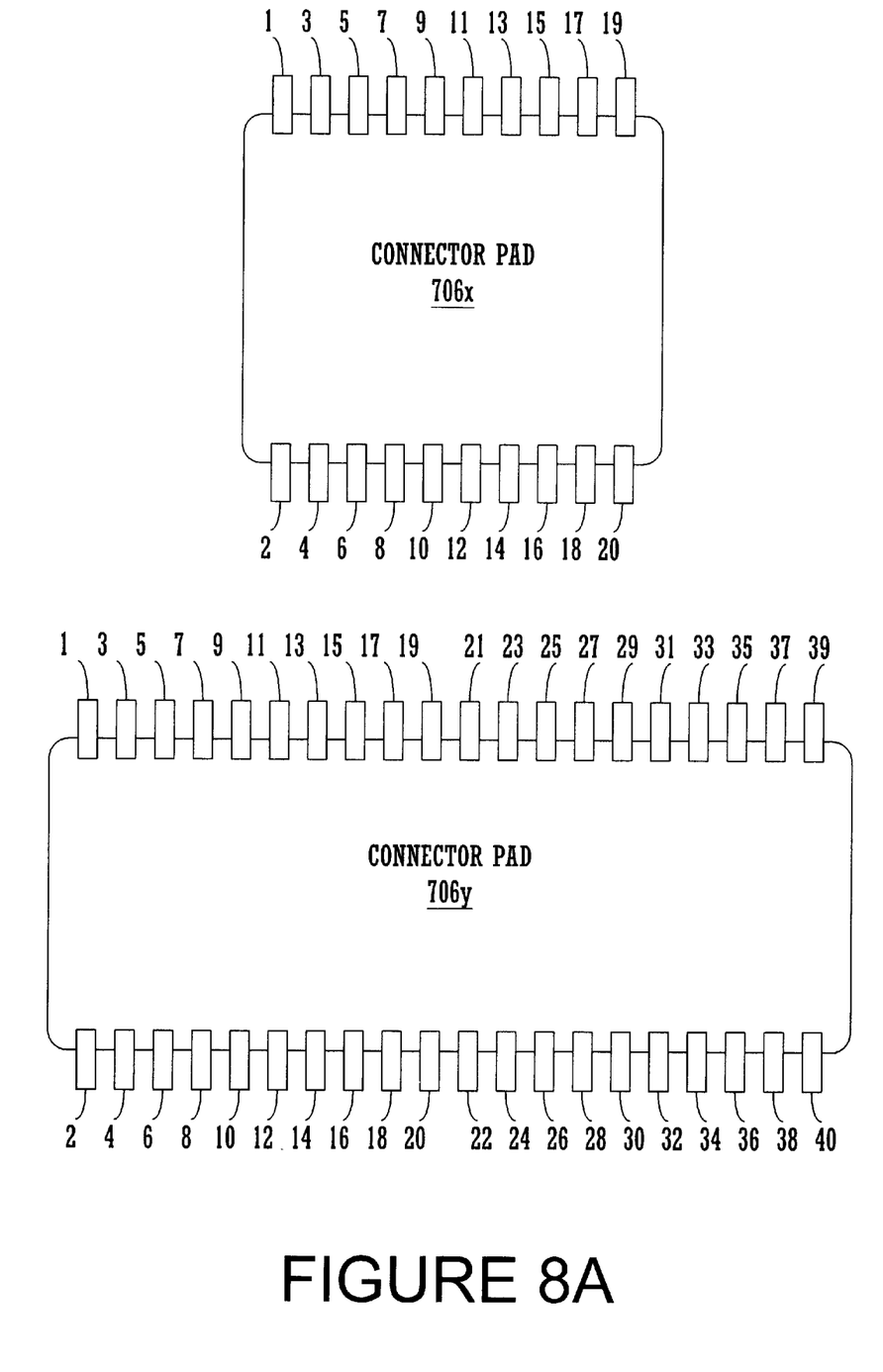
FIG. 8A illustrates exemplary connector pads in accordance with embodiments of the present invention.
Figure 8B:
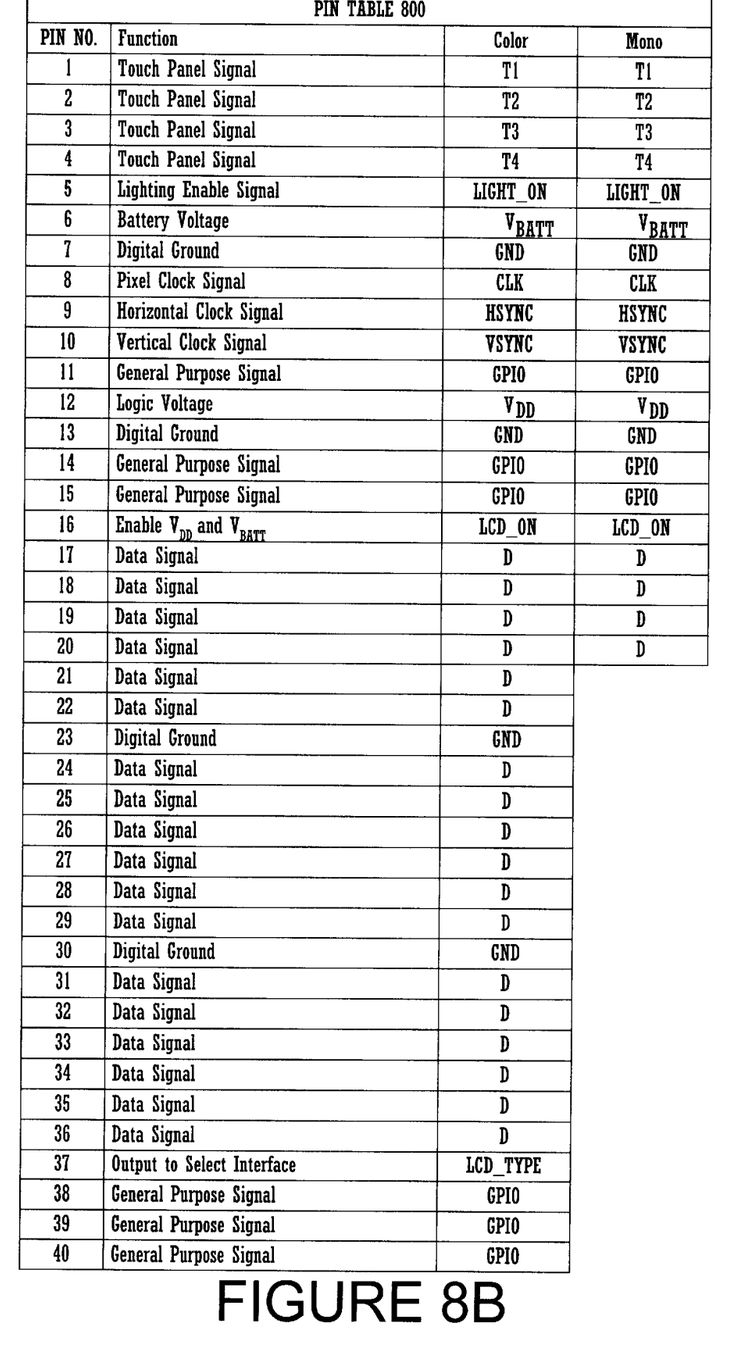
FIG. 8B is an exemplary pin-out table corresponding to the connector pads of FIG. 8A.

FIGS. 8A and 8B illustrate an exemplary standardized communication interface which enables PC board 225 and interface module 620 to universally communicate. Specifically, FIG. 8B is an exemplary pin-out table 800 corresponding to the pins of connector pads 706x and 706y illustrated in FIGS. 8A. Within the present embodiment, connector pads 706x and 706y have been standardized in order to facilitate universal communication between PC board 225 and interface module 620, independent of the display technology implemented on interface module 620. In this manner, any type of display technology implemented on interface module 620 can be easily combined and communicate with PC board 225.

Within the present embodiment, connector pad 706x is a universal connector pad for any type of monochrome display technology, e.g., STN (super-twisted nematic) LCD. For example, connector pad 706x includes twenty pins which have the capability of being used for many different monochrome display technologies. FIG. 8B illustrates one embodiment of the assignment of monochrome display communication signals to pins 1–20 of connector pad 706x. However, in should be understood that the signal assignment shown in FIG. 8B is capable of handling many different monochrome technologies. As such, connector pad 706x is a universal connector pad for any type of monochrome display technology. It is appreciated that connector pad 706x may be incorporated with interface module 620 and/or PC board 225.

Connector pad 706y of the present embodiment is a universal connector pad for any type of display technology (e.g., TFT, STN LCD). For example, connector pad 706y includes forty pins which have the capability of being used for many different monochrome or color display technologies. Specifically, as shown in FIG. 8B, pins 1–40 of connector pad 706y are organized such that pins 1–20 share the same pin assignments as connector pad 706x. As such, pins 1–20 of connector pad 706y are capable of handling many different monochrome technologies. Furthermore, pins 140 may be used for different types of color display communication signals of many different color display technologies. Therefore, connector pad 706y is a universal connector pad for any type of display technology. It is appreciated that connector pad 706y may be incorporated with interface module 620 and/or PC board 225. It should be further appreciated that by including connector pad 706y with PC board 225, PC board 225 has the capability of coupling to an interface module (e.g., 620) containing any type of display technology (monochrome or color). As such, PC board 225 becomes more universal when connector pad 706y is included with it.

Figure 9:
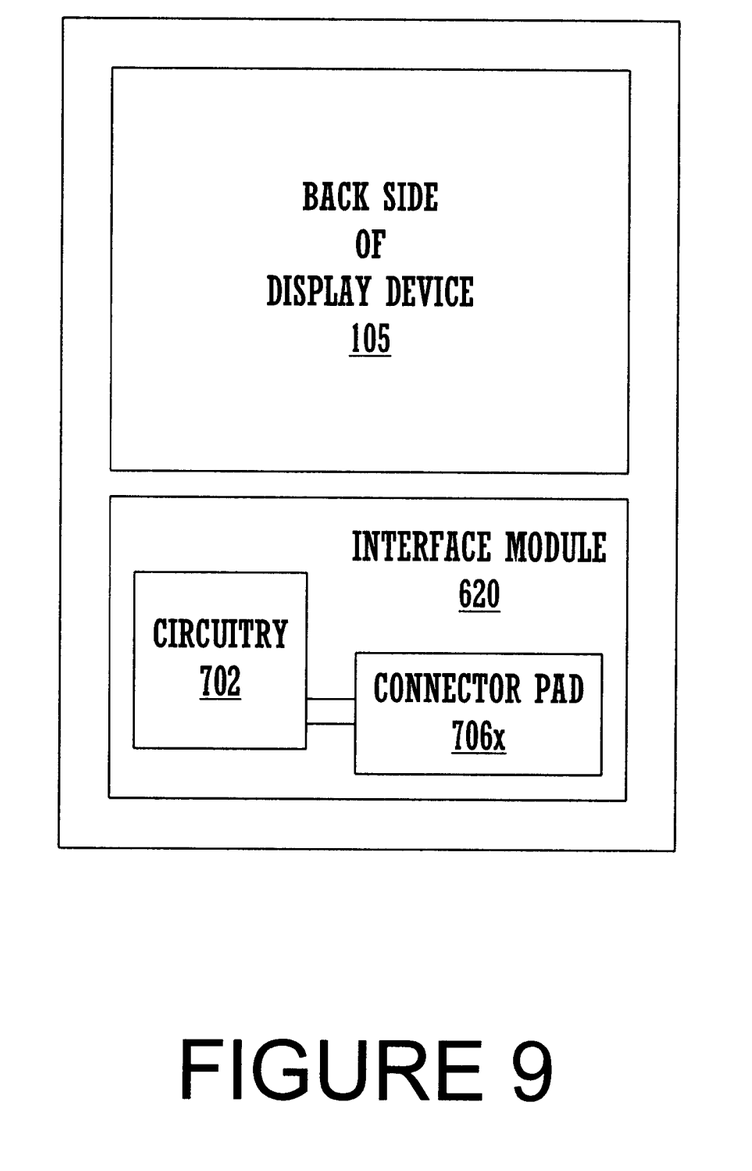
FIG. 9 is a block diagram illustrating an exemplary location of an interface module in accordance with one embodiment of the present embodiment.

FIG. 9 is a block diagram illustrating an exemplary location of interface module 620 in accordance with one embodiment of the present embodiment. Specifically, interface module 620 may be located below the back side of display device 105 and directly behind graffiti area 106 (not shown). It is appreciated that interface module 620 is not strictly limited to the location shown in FIG. 9. On the contrary, interface module 620 of the present embodiment is well suited to be located anywhere within a portable computer device (e.g., 100).

Figure 10:
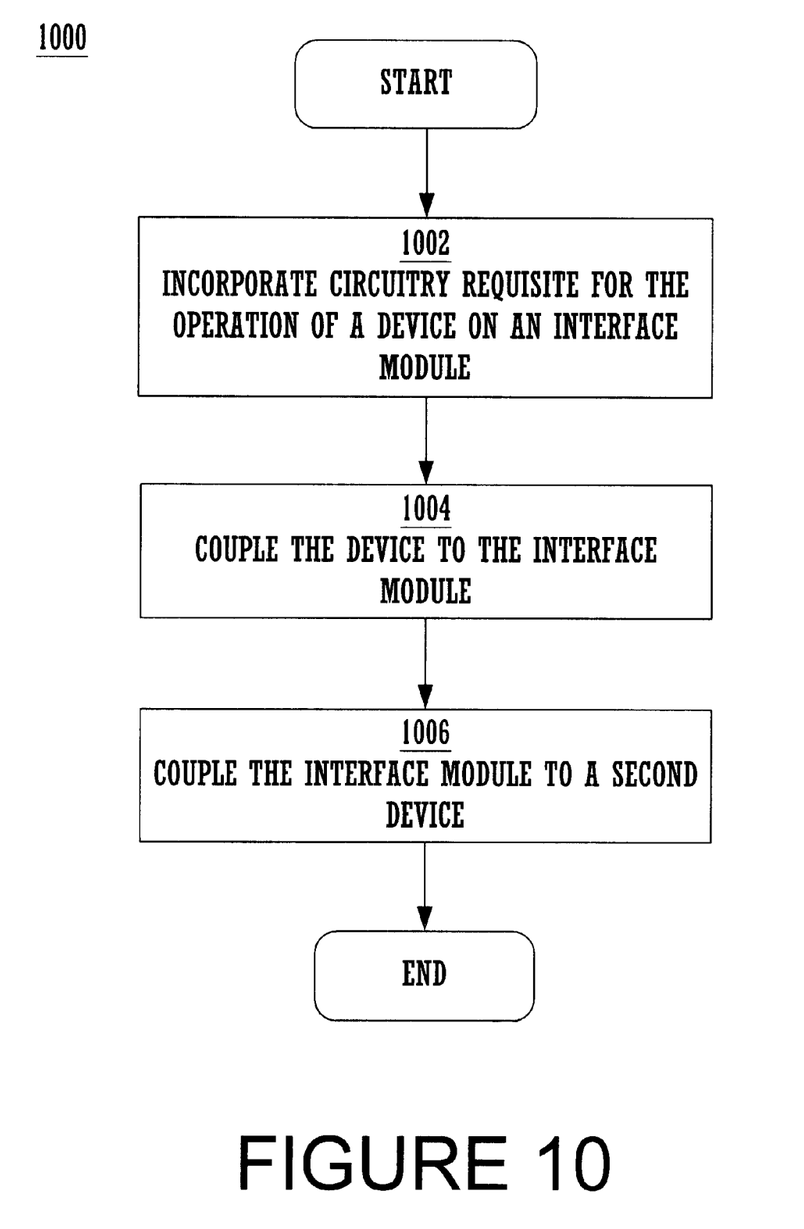
FIG. 10 is a flowchart of steps performed in accordance with one embodiment of the present invention.

FIG. 10 illustrates a flowchart 1000 of steps performed in accordance with one embodiment of the present invention for designing a portable device (e.g., portable computer system 100 of FIG. 5) using a interchangeable display device system. Although specific steps are disclosed in flowchart 1000, such steps are exemplary. That is, the present invention is well suited to performing various other steps or variations of the steps recited in FIG. 10. Within the present embodiment, it should be appreciated that the steps of flowchart 1000 can be performed by software or hardware or any combination of software and hardware.

At step 1002, in the present embodiment, circuitry requisite for the operation of a device is incorporated with an interface module (e.g., 620 of FIG. 5). Within the present embodiment, the device may be any type of device. In one embodiment, the device is a display device (e.g., 105). Furthermore, the circuitry of the present embodiment may include the circuitry (e.g., 702 of FIG. 7) specific to drive and/or operate the device.

In step 1004 of FIG. 10, in the present embodiment, the device may be coupled to the interface module. The device and the interface module may be coupled in a wide variety of ways in accordance with the present embodiment. For example, the device may be coupled to the interface module using a flexible circuit (e.g., 630). At step 1006, in the present embodiment, the interface module is coupled to a second device. It should be appreciated that the second device of the present embodiment may be any type of device. For example, the second device may be a processor (e.g., 101) or a PC board (e.g., 225). It should be appreciated that in one embodiment the PC board includes a controller circuit for controlling the device. Furthermore, the interface module and the second device may be coupled in wide variety of ways in accordance with the present embodiment. For example, they may be coupled by utilizing universal couplers (e.g., connector pads 706x and 706y) that have standardized communication signals (e.g., Pin-Out Table 800). Additionally, the interface module and the second device may be coupled with a flexible circuit (e.g., 640).

Accordingly, the present invention provides a method and system for providing a modular solution which allows customization of a palmtop computing device late in its production process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable computer system comprising:
a display device for performing a display function; and
an interface module coupled to said display device, said interface module comprising circuitry for operating said display function;
wherein said interface module and said display device, in combination, are useable in different portable computer system designs.

2. The portable computer system of claim 1 wherein said interface module comprises a universal coupler.

3. The portable computer system of claim 1 further comprising:
a printed circuit board coupled to said interface module.

4. The portable computer system of claim 3 wherein said printed circuit board comprises a first universal coupler.

5. The portable computer system of claim 4 wherein said interface module comprises a second universal coupler, wherein said first universal coupler is coupled to said second universal coupler.

6. The portable computer system of claim 5 further comprising:
a flexible circuit for coupling said first universal coupler to said second universal coupler.

7. The portable computer system of claim 1 wherein said interface module comprises a printed circuit board.

8. The portable computer system of claim 1 wherein said display device is selected from a liquid crystal display (LCD), a field emission device (FED) display, a plasma display, an organic light emitting diode (OLED) display, an organic electroluminescence display, an electronic ink display, and a thin film transistor (TFT) display.

9. The portable computer system of claim 1 wherein said display device comprises a monochrome display device.

10. The portable computer system of claim 1 wherein said display device comprises a color display device.

11. A method of providing an interface module for different portable computer system designs, said method comprising:
(a) coupling an interface module to a display device, said display device for performing a display function; and
(b) incorporating circuitry for driving said display function of said display device with said interface module, wherein said interface module and said display device, in combination, are useable in different portable computer system designs.

12. The method as recited in claim 11 wherein said interface module comprises a universal coupler.

13. The method as recited in claim 11 further comprising:
(c) coupling said interface module to a printed circuit board.

14. The method as recited in claim 13 wherein said printed circuit board comprises a first universal coupler.

15. The method as recited in claim 14 wherein said interface module comprises a second universal coupler, wherein said first universal coupler is coupled to said second universal coupler.

16. The method as recited in claim 11 wherein said interface module is a printed circuit board.

17. The method as recited in claim 11 wherein said display device is selected from a liquid crystal display (LCD), a field emission device (FED) display, a plasma display, an organic light emitting diode (OLED) display, an organic electroluminescence display, an electronic ink display, and a thin film transistor (TFT) display.

18. The method as recited in claim 11 wherein said display device is a monochrome display device.

19. The method as recited in claim 11 wherein said display device is a color display device.

20. A portable computer system comprising:
a display device for performing a display function according to a format;
an interface module coupled to said display device, said interface module comprising circuitry for operating said display function according to said format; and
a universal circuit coupled to said interface module, wherein said universal circuit is independent of said format;
wherein said interface module and said display device, in combination, are useable in different portable computer system designs.

21. The portable computer system of claim 20 wherein said interface module comprises a printed circuit board.

22. The portable computer system of claim 20 wherein said interface module comprises a universal coupler.

23. The portable computer system of claim 20 wherein said universal circuit comprises a first universal coupler.

24. The portable computer system of claim 23 wherein said interface module comprises a second universal coupler, wherein said first universal coupler is coupled to said second universal coupler.

25. The portable computer system of claim 20 wherein said display device is selected from a liquid crystal display (LCD), a field emission device (FED) display, a plasma display, an organic light emitting diode (OLED) display, an organic electroluminescence display, an electronic ink display, and a thin film transistor (TFT) display.

26. The portable computer system of claim 20 wherein said format is a monochrome display.

27. The portable computer system of claim 20 wherein said format is a color display.

28. The portable computer system of claim 20 wherein said universal circuit is a printed circuit board comprising a processor.

* * * * *